(No Model.)　　　　　　　J. WHEELOCK.　　　　　4 Sheets—Sheet 2.
CUT-OFF VALVE AND GEAR.
No. 291,249.　　　　　　　　　　　Patented Jan. 1, 1884.
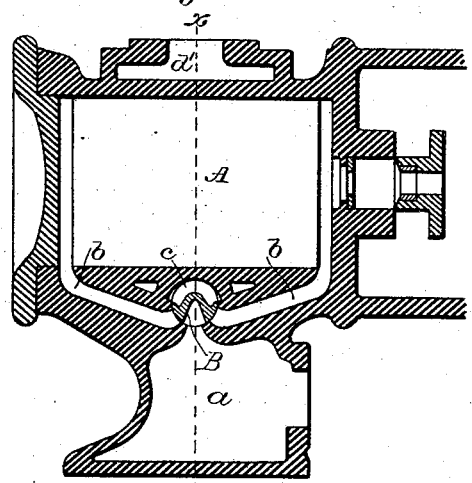
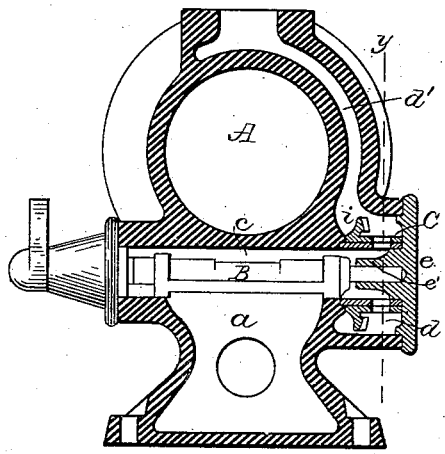
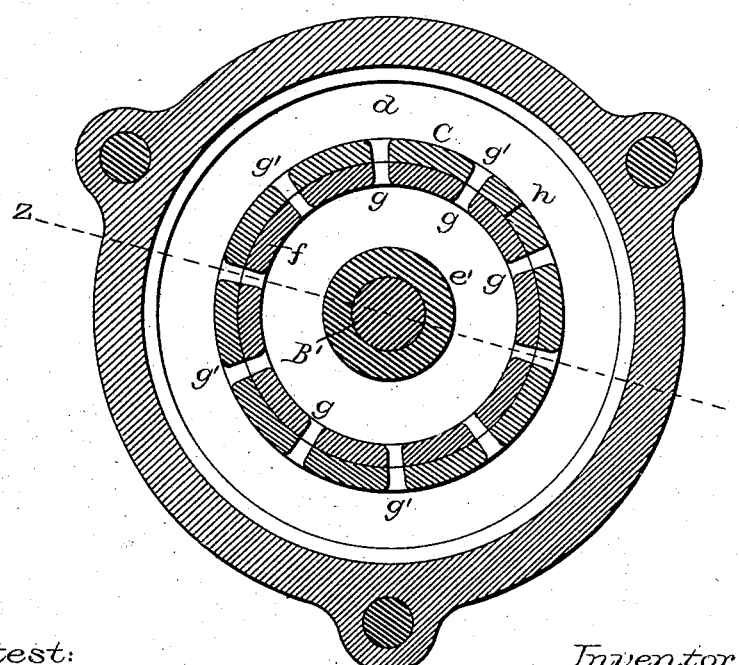
Attest:
Philip F. Larner
Nowell Bartt
Inventor:
Jerome Wheelock
By M. C. Mord
Attorney.

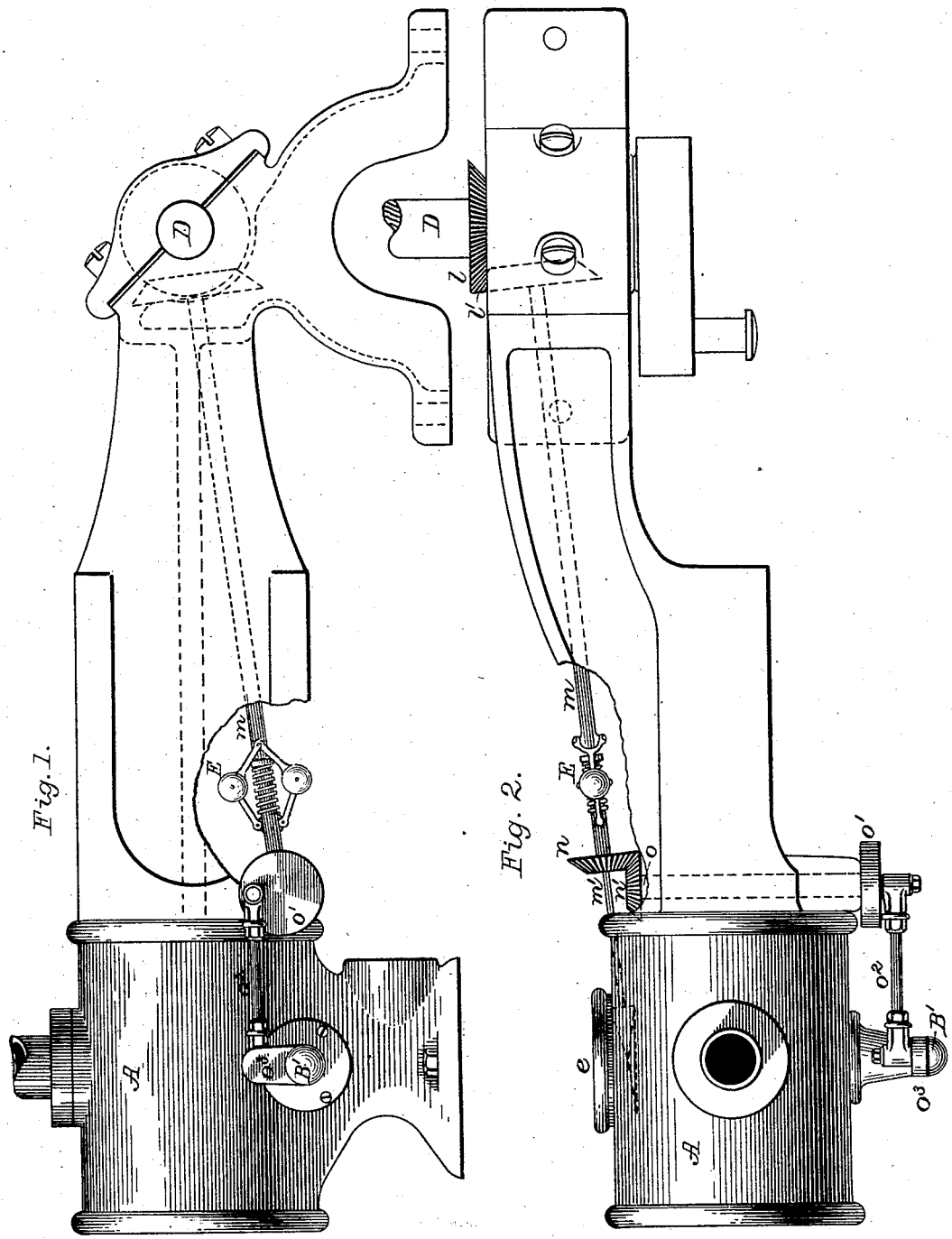

(No Model.) 4 Sheets—Sheet 3.

J. WHEELOCK.
CUT-OFF VALVE AND GEAR.

No. 291,249. Patented Jan. 1, 1884.

Attest:
Philip F. Larned
Howell Bartle

Inventor:
Jerome Wheelock
By McWood
Attorney.

(No Model.) 4 Sheets—Sheet 4.

J. WHEELOCK.
CUT-OFF VALVE AND GEAR.

No. 291,249. Patented Jan. 1, 1884.

Attest:
Philip F. Larner
Howell Bartle

Inventor:
Jerome Wheelock
By Wm. C. Wood
Attorney.

UNITED STATES PATENT OFFICE.

JEROME WHEELOCK, OF WORCESTER, MASSACHUSETTS.

CUT-OFF VALVE AND GEAR.

SPECIFICATION forming part of Letters Patent No. 291,849, dated January 1, 1884.

Application filed April 28, 1883. (No model.)

*To all whom it may concern:*

Be it known that I, JEROME WHEELOCK, of the city and county of Worcester, in the State of Massachusetts, have invented certain new and useful Improvements in Cut-Off Valve and Gear for Steam-Engines; and I do hereby declare that the following specification, taken in connection with the drawings furnished and forming a part of the same, is a clear, true, and complete description of my invention.

My said improvements include an annular revolving valve, which is revolved continuously while the engine to which it is attached is in motion. When said valve is employed with a governor, it is caused to be advanced or retarded during its rotation, or, in other words, it is caused while revolving to vary its relations to its valve-seat and to the ports therein, so as to provide for the induction of steam to both ends of a cylinder to the maximum extent ever required, or for automatically cutting off the steam at varied fractions of the stroke, according to varying requirements; and the prime objects of my invention are to provide for a practicably serviceable automatic cut-off valve of a simple, effective, and comparatively economical character, especially valuable for high-speed engines.

My said improvements in their best form are employed in connection with a valve or valves relied upon for controlling the direct induction of steam to the cylinder and its eduction therefrom, and said valves may be largely varied in their character, construction, and mode of operation without affecting my invention.

I have herein chosen to illustrate my improvements in connection with a single valve which controls the eduction and induction of steam, and in connection with a cylinder having passages through which steam is alternately inducted and educted. It is to be understood, however, that my revolving annular valve may be used in accordance with certain features of my invention, and be relied upon solely for controlling the induction of steam to a cylinder in connection with other valves solely relied upon for controlling the exhaust or eduction of steam.

Figure 7:
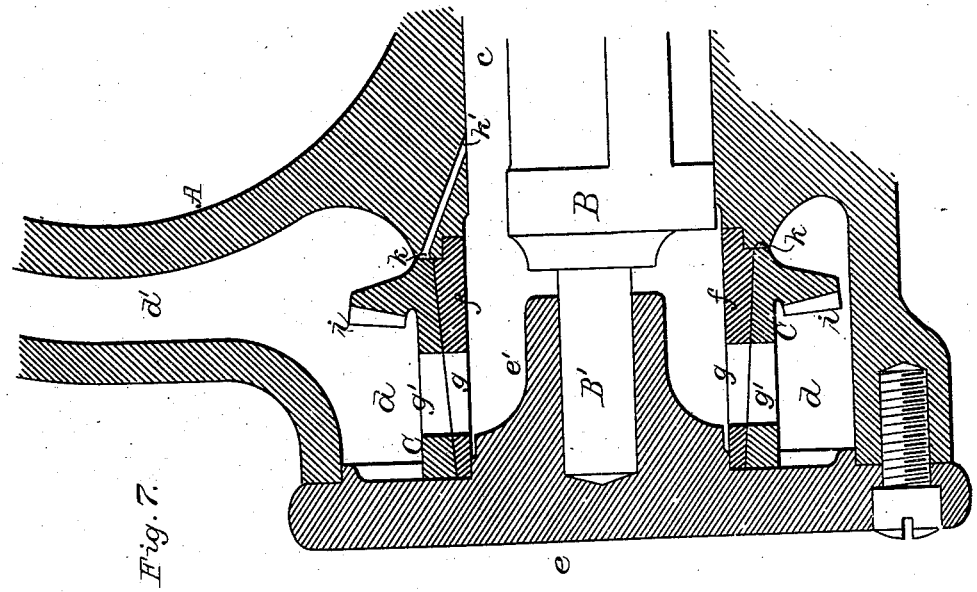
Figure 6:
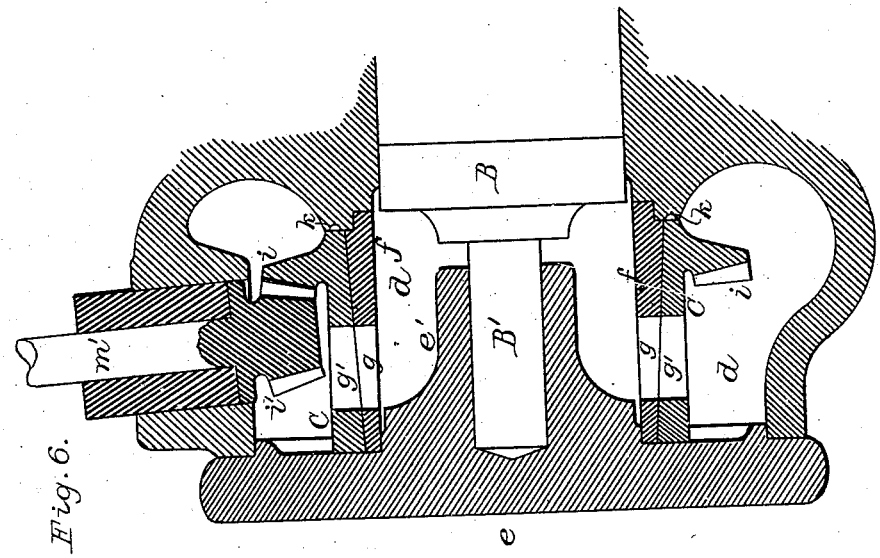
Figure 8:
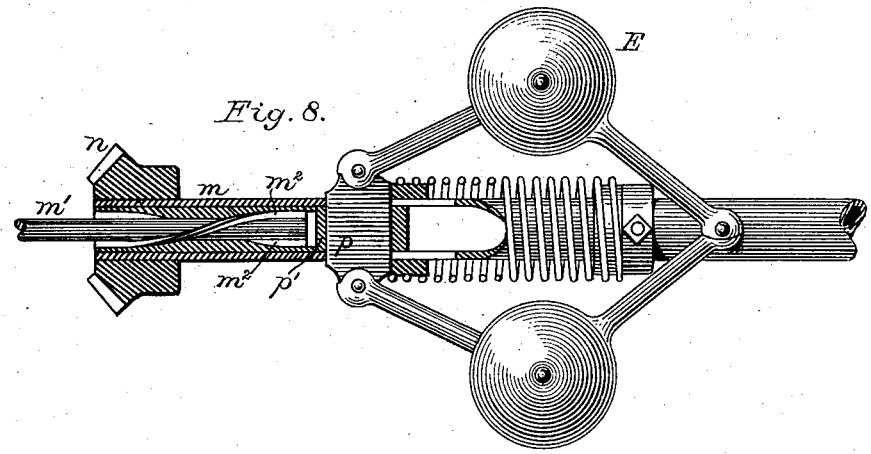
Figure 9:
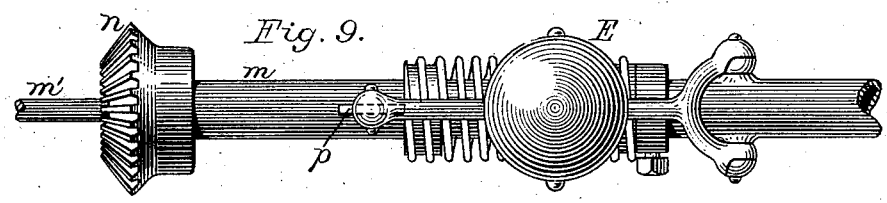
Figure 10:
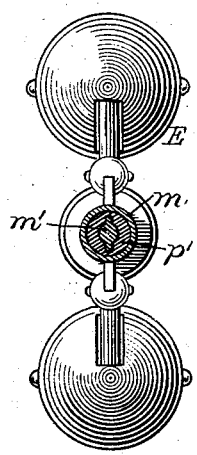
Figure 11:
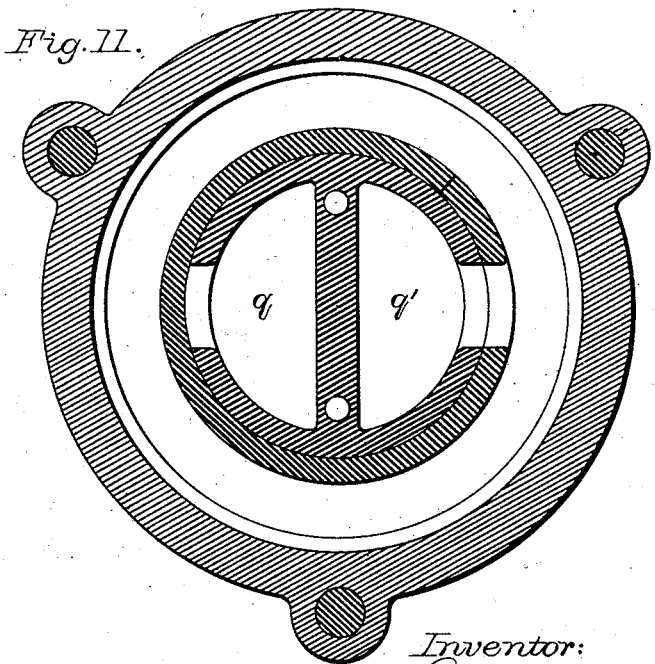

To particularly describe my invention, I will refer to the accompanying drawings, in which Figure 1 is a side elevation of so much of a steam-engine as is deemed necessary to illustrate the application of my improvements thereto. Fig. 2 is a top view of the same with portions of the top of the bed-casting broken away to disclose the valve-operating mechanism. Fig. 3 is a central vertical longitudinal section of the cylinder. Fig. 4 is a transverse vertical central section on line $x$, Fig. 3. Fig. 5 is an enlarged view of my revolving annular valve, its seat, and steam-chamber containing the same, in central vertical section on line $y$, Fig. 4. Fig. 6 is a view of the same parts on line $z$, Fig. 5, in horizontal central section, and showing the pinion and shaft by which the annular valve is revolved. Fig. 7 is an enlarged view of the right-hand portion of Fig. 4. Figs. 8, 9 and 10, are detached views of the governing mechanism and the shafting which revolves the annular valve, and also operates the valve which inducts steam to and exhausts it from the cylinder. Fig. 11 is a vertical central section of my annular valve as arranged to directly control the induction of steam to a cylinder.

My improvements are here shown as applied to a horizontal engine; but it is to be understood that they are equally applicable to other types of engine. The cylinder A, as here shown, is mounted upon or may be cast integrally with its standard or base, which is hollow, and serves as an exhaust-chamber, $a$. The two passages $b$ extend from each end of the cylinder downward and toward each other, terminating at the oscillating valve B, which is mounted axially, and alternately admits steam from the space $c$ above and partially around the valve downward into said passages $b$, and it also alternately exhausts steam therefrom into the exhaust-chamber $a$, in a manner well known. Upon one side of the cylinder, as seen in Figs. 2 and 4, there is an annular steam chest or chamber, $d$, provided with a head, $e$, which is secured in place by bolts, and has an inwardly-projecting hub, $e'$, the center of which serves as a bearing for one end of the spindle B' of the oscillating valve. This steam-chamber $d$ receives steam by way of a vertical passage, $d'$, extending to the upper side of the cylinder, to which the steam-pipe is connected for communicating with a boiler.

Referring now to Fig. 7, it will be seen that within the steam-chamber $d$ there is an annular valve-seat, $f$, which at its inner end occupies an annular recess in the cylinder-casting surrounding the valve B, and at its outer end it in turn occupies an annular bearing on the outer surface of the hub $e'$ at the inner side of the head $e$, so that the latter, when bolted in place, firmly clamps the seat $f$ and forms steam-tight joints at each end thereof. This annular seat is tapered externally, as shown, its outer end being the smallest, and it is in this case provided with radial ports $g$, equally distributed around the seat, as seen in Fig. 5, and, although said ports may be varied in number, I prefer ten of them, as shown. Upon this tapered annular valve-seat is the independent annular valve C, internally tapered to correspond with said seat, so that the steam-pressure thereon will have a tendency to force the valve into close relations with its seat, thus compensating for wear and maintaining a good steam-tight joint; but to prevent said valve from binding too tightly thereon, it is cut transversely at one point, as seen at $h$, Fig. 5. The ports $g'$ of the annular valve correspond in size, number, and spacing with the ports $g$ in the seat. The annular valve is rotated continuously on its seat while the engine is in motion, and its driving-gearing may be variously organized and applied thereto without departure from my invention; but I have here shown said valve to be provided with a bevel-gear, $i$, connected to or integrally cast therewith, and located at its inner end.

As seen in Fig. 6, the steam-chamber $d$ has in one side of its wall a bushing or bearing for a shaft, provided at its inner end with a bevel-pinion, $i'$, which meshes with the gear $i$ on the annular valve. In order to partially offset that steam-pressure on the annular valve which drives it inward and upward on its tapered seat, I provide an annular groove, $k$, in the cylinder-casting adjacent to the inner end of the valve, and connect said groove, (which is in substance an annular chamber,) by way of the duct $k'$, with the steam-space $c$, into which the steam passes on its way to the oscillating valve.

As thus far described, it will be seen that the oscillating valve, operated as is usual with such valves, or as with simple slide-valves, does not vary in its movements, and that, if the annular valve be so timed in its revolution that its ports are opened during the induction of steam by the oscillating valve, the latter will supply steam to the cylinder precisely as if the annular valve were not present; but it is obvious that even then the annular valve is of value, because leakage of steam into the cylinder after the closure by the oscillating valve is absolutely prevented. It will also be seen, if the annular valve be advanced in its relative position on its seat beyond that position normally occupied by it with reference to the position of the oscillating valve, that steam will be cut off from passing to the oscillating valve before its closure, and therefore, although the annular valve is always revolving at a speed corresponding with that of the crank-shaft, it is also arranged to be advanced upon its seat by the operation of a governor, thus affording results incident to a variable cut-off. The annular valve operating as a cut-off may be variously driven; but I prefer to drive it directly from the crank-shaft and at a corresponding speed.

As shown in the drawings, the crank-shaft D is provided with a bevel-gear, $l$, which meshes with a bevel-gear, $l'$, on the nearly-horizontal revolving valve-shaft $m$, which extends nearly to the cylinder, and has at its opposite end a bevel-gear, $n$, which meshes with a gear, $n'$, on a lateral shaft, $o$, having at its opposite end a crank plate or disk, $o'$, connected by a link, $o^2$, with an arm, $o^3$, on the axis B' of the oscillating valve B, thus securing for this valve its requisite uniform oscillating movement. The shaft $m$, at its end nearest the cylinder, is hollow, and contains one end of a smaller shaft, $m'$, which is splined therein, and is extended into the steam-chamber $d$, for carrying the beveled pinion $i'$, before described as meshing with the gear $i$ on the annular valve C.

The character of the governor and the mode of applying it for operating the annular valve as a cut-off valve can be widely varied without departure from my invention; but I have illustrated in Figs. 8 to 10, inclusive, the details of one well-known form of governor as used by me for that purpose. It will be seen that the ball-governor E in itself is similar to others heretofore used for longitudinally reciprocating a rod applied to a throttle-valve, or as otherwise connected for operating prior cut-off mechanism. The cross-head $p$ of the governor occupies a longitudinal slot in the hollow portion of the shaft $m$, and it is backed by an expansive spiral spring provided with the usual adjusting-collar and set-screw. Within said hollow shaft there is a sliding cylindrical hollow block or bar, $p'$, which is connected to the cross-head $p$ of the governor, and is moved longitudinally thereby, and is also in substance splined to the shaft $m$ by said cross-head, so that they all revolve together. The hollow bar $p'$ is spirally grooved, as seen in Figs. 8 and 10, and is occupied by the end of the extension-shaft $m'$, which is provided with spiraled splines or feathers $m^2$, so that when the block or bar $p$ is moved longitudinally by the spreading of the balls of the governor under undue centrifugal influences the extension-shaft $m'$, pinion $i'$ on the end thereof, and the annular valve C are all rotated slightly in advance of the position they would otherwise occupy, thus causing the annular valve to close its ports before the induction of steam is cut off by the oscillating valve; and it is obvious that as the governor resumes its normal position the rotation of said extension-shaft $m'$ and the annular valve will be slightly retarded, for enabling the latter to again operate in harmony with the oscillating valve.

The governor may be relied upon for so controlling the annular valve as to cause a complete closure of its ports before the oscillating valve commences to operate for induction, it being obvious that the multiplicity of ports in said valve enables them to be closed by a small fraction of a revolution of the valve.

For lubricating the gearing within the steam-chamber, and also the annular valve and the adjacent stem of the oscillating valve, I provide on the exterior of the chamber an oil-pump and a series of tubes or ducts leading therefrom through the head to such points within the chamber as will assure a proper distribution of the lubricant.

While I am aware that the prime value of the continuously-driven annular valve is available only when it is used in combination with a steam-valve of some kind interposed between it and the engine-cylinder, I do not preclude myself from such a combination of the annular valve with a steam-cylinder as will enable said annular valve to operate as the only induction-valve. I have illustrated in Fig. 11 an annular valve having but one port mounted upon a seat having two ports oppositely located, so that as the valve revolves it alternately admits steam into said ports for supplying opposite ends of a cylinder by way of the two steam-passages $q$ and $q'$.

Although I prefer that the annular valve should be mounted outside of its cylindrical seat, it is obvious that good results will accrue if the valve be mounted so as to revolve within a cylindrical seat, in which case the valve-gear $i$ would be mounted next to the inner surface of the steam-chamber head $e$, and the hub of the latter could then serve as a bearing for the outer end of the valve, and its inner end could be provided with a bearing in an annular recess in an obvious manner. The seat in this case would be wholly supported at its inner end. The valve and seat thus constructed should be tapered, the inner end of the valve being smaller than the outer end.

I am aware that it is not new to employ in combination an annular steam-chamber within a steam-cylinder and attached to the head thereof, and a revolving annular valve within said chamber, which controls the induction and exhaust of steam, and within said revolving valve an annular cut-off or valve which is axially rotated to and fro by a governor.

I am also aware that a revolving disk-valve has heretofore been employed for controlling induction and exhaust, in combination with a sectoral cut-off plate on top of said valve, revolved therewith, and advanced or retarded by the governor for varying the area of the steam-port in said disk-valve; and I am still further aware that steam for supplying both ends of a cylinder has been controlled by an annular valve rotated with a governor, and also moved longitudinally by the action of said governor for varying the cut-off; but I believe I am the first to organize with a cylinder having induction-passages extending to both ends thereof, an annular valve which is limited to a rotary movement, and is thereby capable of being caused to vary the supply of steam to both ends of the cylinder by being advanced or retarded in its rotary movement.

Having thus described my invention, I claim as new and desire to secure by Letters Patent—

1. The combination, substantially as hereinbefore described, of a steam-engine cylinder having induction-passages extending to each end thereof, a steam chest or chamber communicating with both of said passages, an annular valve limited to a rotary movement within said steam-chest, and gearing for continuously revolving said valve at a speed corresponding with that of the engine.

2. The combination, substantially as hereinbefore described, of a steam-engine cylinder, an annular valve for controlling the passage of steam thereto, gearing for revolving the valve, and a governor for advancing or retarding said valve during its rotation.

3. The combination, substantially as hereinbefore described, of a steam-engine cylinder, a valve or valves for directly controlling the induction and eduction of steam to and from the cylinder, an independent annular revolving steam-valve which controls the passage of steam on its way to the induction-valve, and a governor which advances or retards the annular valve and cuts off or varies the supply of steam to the induction-valve and cylinder.

4. The combination, in a steam-engine, of the cylinder having passages alternately serving for induction and eduction of steam, a single valve which operates with both passages for induction and eduction, and an independent annular cut-off valve revolved by gearing connected with the crank-shaft of the engine, substantially as described.

5. In a steam-engine, the combination, substantially as described, with the crank-shaft and cylinder, of an annular revolving valve, an oscillating induction and eduction valve, a revolving valve-shaft driven by the crank-shaft, and geared to both of said valves, for continuously revolving the one and for oscillating the other, and a governor mounted on said valve-shaft, for controlling the annular valve and cutting off or varying the supply of steam to the oscillating valve.

JEROME WHEELOCK.

Witnesses:
JOHN A. HOWARTH,
E. KIMMEL.